United States Patent
Arte et al.

(10) Patent No.: US 8,572,655 B2
(45) Date of Patent: Oct. 29, 2013

(54) VIDEO ON DEMAND (VOD) RECOMMENDATIONS BASED ON USER VIEWING HISTORY

(75) Inventors: Laxmi A. Arte, Irving, TX (US); Mukunda P. Raju, Irving, TX (US); Enrique Ruiz-Velasco, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 370 days.

(21) Appl. No.: 12/636,021

(22) Filed: Dec. 11, 2009

(65) Prior Publication Data

US 2011/0061069 A1 Mar. 10, 2011

Related U.S. Application Data

(60) Provisional application No. 61/240,688, filed on Sep. 9, 2009.

(51) Int. Cl.
*H04N 5/445* (2011.01)

(52) U.S. Cl.
USPC ........ 725/46; 725/9; 725/14; 725/45; 725/47; 725/131

(58) Field of Classification Search
USPC ............... 725/14, 46, 131, 9, 29, 45, 47
See application file for complete search history.

(56) References Cited

U.S. PATENT DOCUMENTS

| | | | |
|---|---|---|---|
| 7,337,458 B2 * | 2/2008 | Michelitsch et al. | 725/46 |
| 2009/0178081 A1 * | 7/2009 | Goldenberg et al. | 725/46 |
| 2009/0187944 A1 * | 7/2009 | White et al. | 725/46 |

* cited by examiner

*Primary Examiner* — Jivka Rabovianski

(57) ABSTRACT

A system collects a user's television (TV) program viewing activity and uses the collected TV program viewing activity to make video on demand (VOD) recommendations to other users via a VOD recommendation service. The system receives an indication that the user wishes to turn on a VOD recommendation service and deletes previously collected TV program viewing activity for the user based on the received indication. The system collects the user's recent TV program viewing activity, which occurs subsequent to the received indication and the deletion of the previously collected TV program viewing activity, and uses the user's collected recent TV program activity to make other VOD program recommendations to the user via the VOD recommendation service.

19 Claims, 12 Drawing Sheets

VIDEO ON DEMAND (VOD) RECOMMENDATIONS BASED ON USER VIEWING HISTORY

CROSS REFERENCE TO RELATED APPLICATION

This application claims priority to U.S. Provisional Patent Application No. 61/240,688, filed Sep. 9, 2009, the disclosure of which is incorporated by reference herein in its entirety.

BACKGROUND

Video on Demand (VOD) systems permit users to select and watch video content on demand. VOD systems typically stream video content through a set-top box (STB) so as to allow viewing of the video in real time at the request of the user. Many cable television providers (or other providers) offer VOD streaming, such as pay-per-view, where the user buys or selects a movie or television program and the selected movie or television program begins to play on the user's television immediately.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein may enable VOD programming recommendations lists to be provided to users via, for example, the users' set-top boxes. In some embodiments described herein, a user's television program viewing activity, and other users' television program viewing activity, may be used in providing the VOD recommendations lists to the user. The user's television program viewing activity, and other user's television program viewing activity, may be used to generate clusters of users that have similar viewing habits. The generated clusters may be used when determining VOD programming to include in a recommendations list for a given user. Users may selectively "turn on" or "turn off" the VOD recommendation service described herein.

Figure 1:
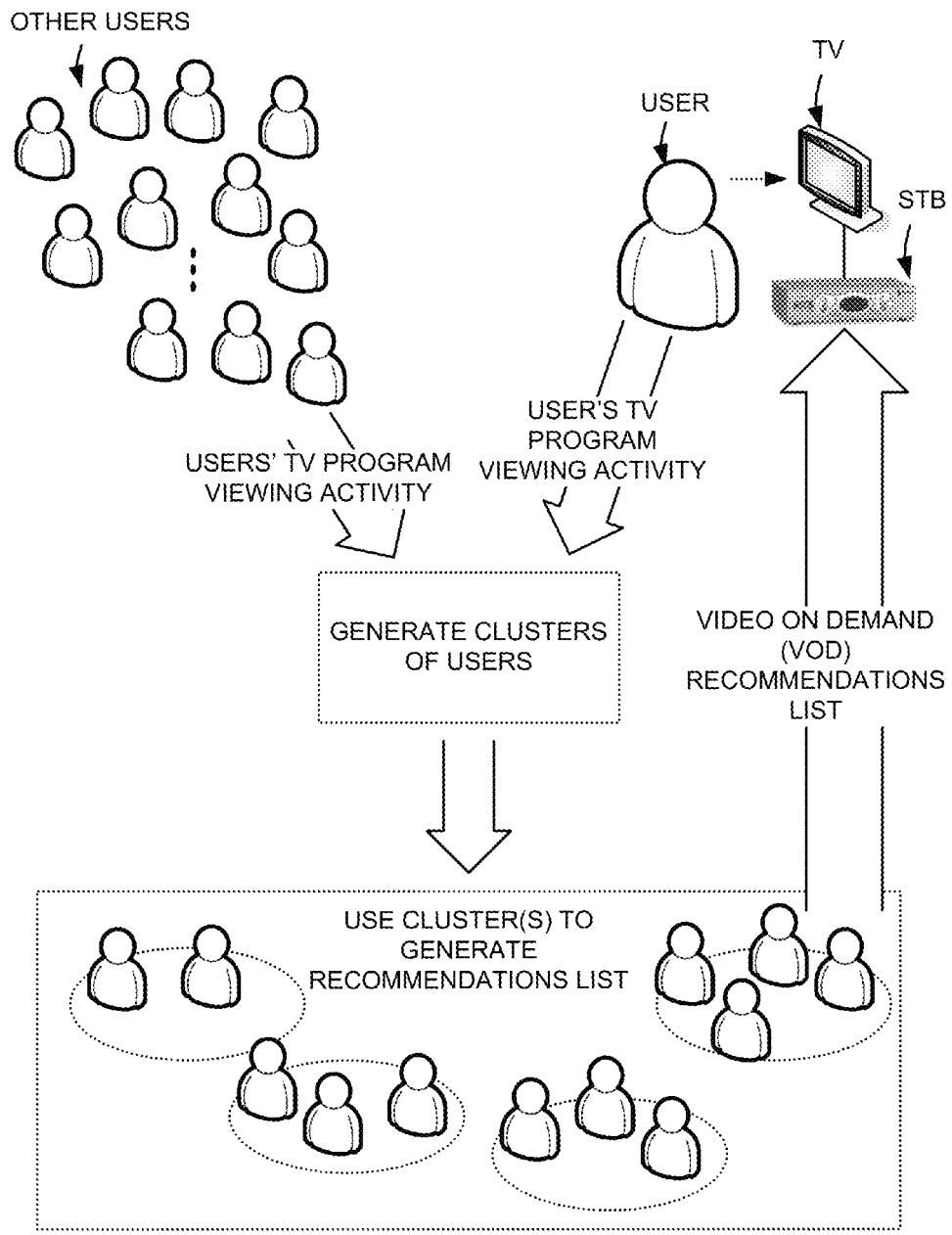
FIG. 1 is a diagram of an overview of an exemplary embodiment described herein.

FIG. 1 is a diagram of an overview of an exemplary embodiment described herein in which a user's television program viewing activity is used to generate a VOD recommendations list to the user. As shown in FIG. 1, a user's television (TV) program viewing activity, obtained while the user is viewing TV program's via a set-top box (STB) connected to a TV, in conjunction with other users' TV program viewing activity, may be used to generate clusters of users. Any type of clustering technique may be used to generate the clusters of users. For example, customer techniques that identify users with similar TV program viewing activity (e.g., similar programs, similarly rated programs, the same channels, the same genres of TV programming, etc.) may be used to generate the clusters of users. The generated clusters may then be used to generate a VOD recommendations list for provision to the user via the STB. For example, VOD recommendations of users in a same cluster as the user may be included in the VOD recommendations list provided to the user.

Figure 2:
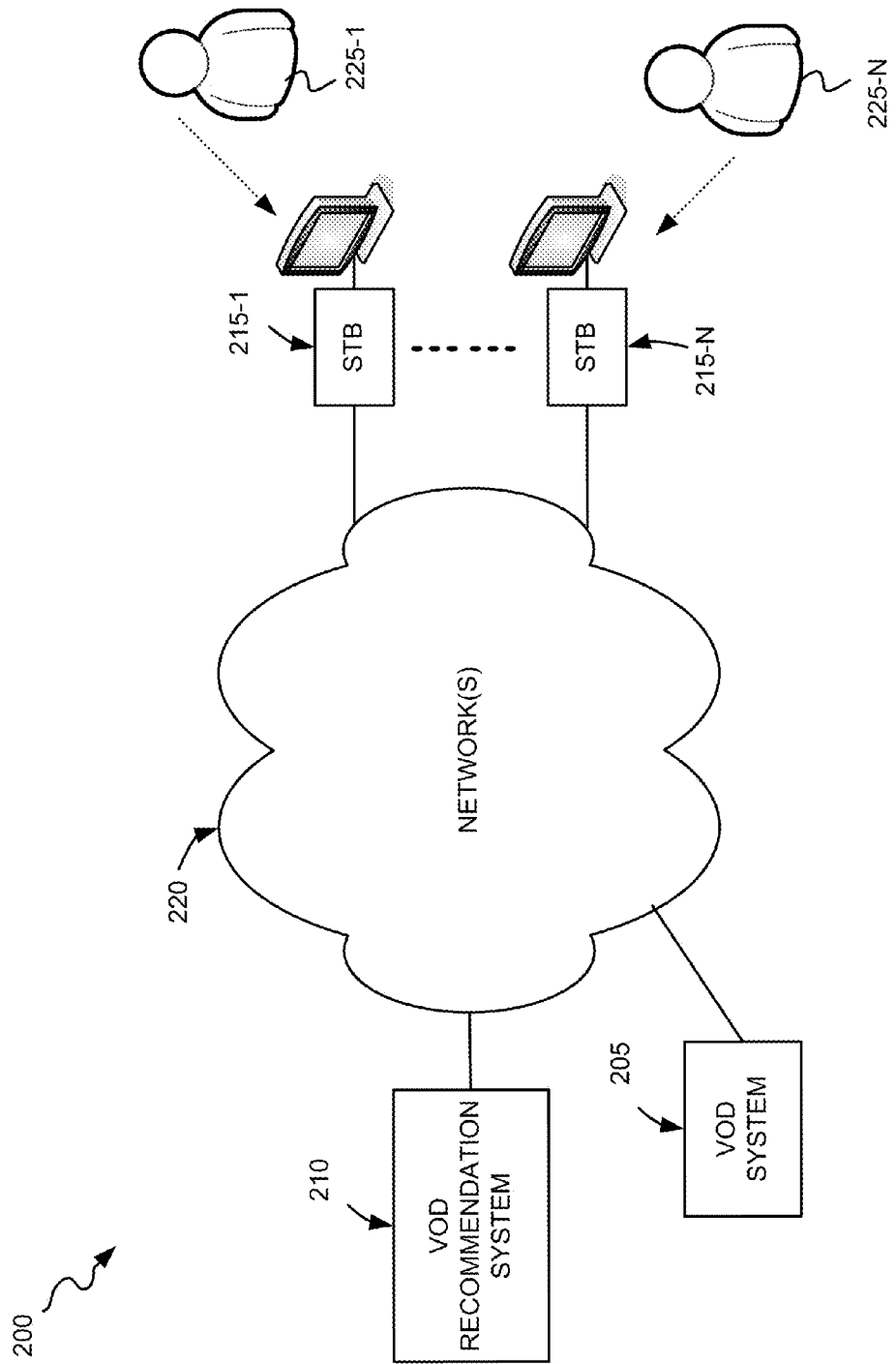
FIG. 2 is a diagram of an exemplary network in which VOD recommendations may be provided to one or more users.

FIG. 2 is a diagram of an exemplary network 200 in which VOD recommendations may be provided to one or more users. Network 200 may include a VOD system 205, a VOD recommendation system 210, and STBs 215-1 through 215-N connected to network(s) 220 via wired or wireless links. As shown in FIG. 2, users 225-1 through 225-N may be associated with respective STBs 215-1 through 215-N. For example, user 225-1 may be associated with STB 215-1, user 225-N may be associated with STB 215-N, etc.

VOD system 205 may include one or more devices that provide selected VOD programming to users 225-1 through 225-N via STBs 215-1 through 215-N. The VOD programming may include any type of video that can be made available on demand, including sports programs, movies, dramas, comedies, etc. VOD recommendation system 210 may provide VOD recommendations lists to users who "turn on" the VOD recommendation service offered by VOD recommendation system 210. Users 225-1 through 225-N may "turn on" the VOD recommendation service via, for example, respective STBs 215-1 through 215-N.

VOD recommendation system 210 may include one or more devices that provide the VOD recommendations lists to users 225-1 through 225-N based on the respective users' TV program viewing activity, as described in further detail below.

Each of STBs 215-1 through 215-N may include any type of set top box that permits a user to select TV and/or VOD programs to view on a display device. In some embodiments, STBs 215-1 through 215-N may include a digital video recorder (DVR) for digitally recording TV programs. As shown, each of STBs 215-1 through 215-N may be connected to a display device, such as, for example, a TV. In one embodiment, one or more of STBs 215-1 through 215-N may be incorporated within a display device, such as a TV.

Network(s) 220 may include one or more networks, such as, for example, a local area network (LAN), a wide area network (WAN), a metropolitan area network (MAN), an intranet, the Internet, a wireless satellite network, a cable network (e.g., an optical cable network), and/or a wireless public land mobile network (PLMN).

Network 200 may include additional, fewer and/or different network components than those depicted in FIG. 2. In an exemplary embodiment, VOD system 205 and VOD recommendation system 210 may be the same system, or may include different systems that share system components.

Figure 3:
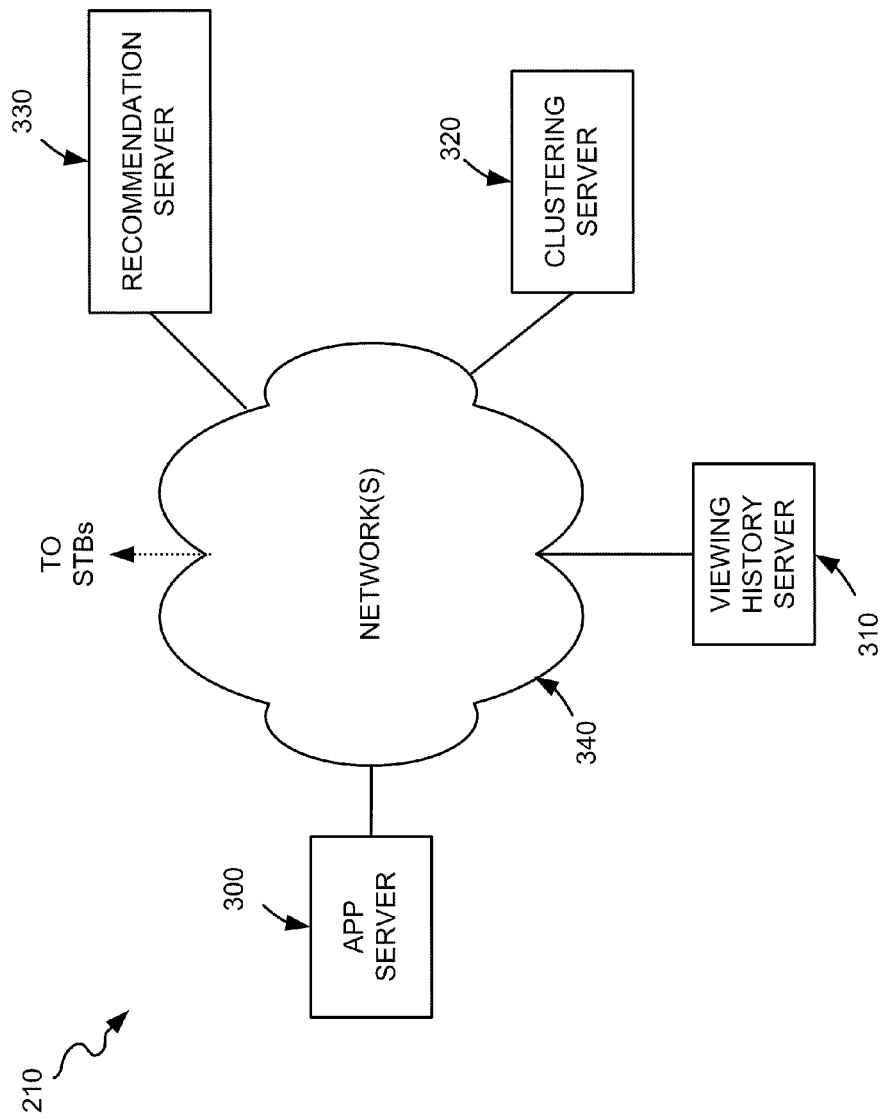
FIG. 3 is a diagram that depicts components of the VOD recommendation system of FIG. 2 according to an exemplary embodiment.

FIG. 3 depicts components of VOD recommendation system 210 according to an exemplary embodiment in which VOD recommendation system 210 may comprise multiple devices. VOD recommendation system 210, in the exemplary embodiment shown in FIG. 3, may include an application server 300, a viewing history server 310, a clustering server 320 and a recommendation server 330 connected to a network (s) 340.

Application server 300 may include one or more devices that provide TV programming data and a user interface to STB 215. Application server 300 may send VOD recommendation requests to recommendation server 330 to obtain VOD recommendations lists.

Viewing history server 310 may include one or more devices that maintain logs of users' TV program viewing activity. Viewing history server 310 may collect the viewing activity of users 225-1 through 225-N via respective STBs 215-1 through 215-N and store appropriate entries in a table (e.g., table 500 described below). Viewing history server 310 may analyze the viewing activity of users 225-1 through 225-N to obtain various viewing parameters, such as, for example, identifiers for TV programs viewed, ratings for those TV programs, channels corresponding to the viewed TV programs, languages associated with the viewed TV programs, and/or genres of the viewed TV programs.

Clustering server 320 may include one or more devices that obtain viewing activity logs from viewing history server 310 and may cluster users using the viewing activity logs. For example, users with similar viewing habits (i.e., same channels, same TV programs, etc.) may be clustered within a same cluster. Cluster server 320 may send the generated clusters of users to recommendation server 330.

Recommendation server 330 may include one or more devices that obtain viewing activity logs from viewing history server 310, and may use the viewing activity logs and the received clusters to generate VOD recommendations lists. Recommendation server 330 may send the generated VOD recommendations lists to respective users 225-1 through 225-N via their STBs 215-1 through 215-N.

Network(s) 340 may include one or more networks, such as, for example, a LAN, a WAN, a MAN, an intranet, the Internet, a wireless satellite network, a cable network (e.g., an optical cable network), and/or a wireless PLMN. Network(s) 340 may include a separate network from network(s) 220, or may comprise a portion of network(s) 220.

Figure 4:
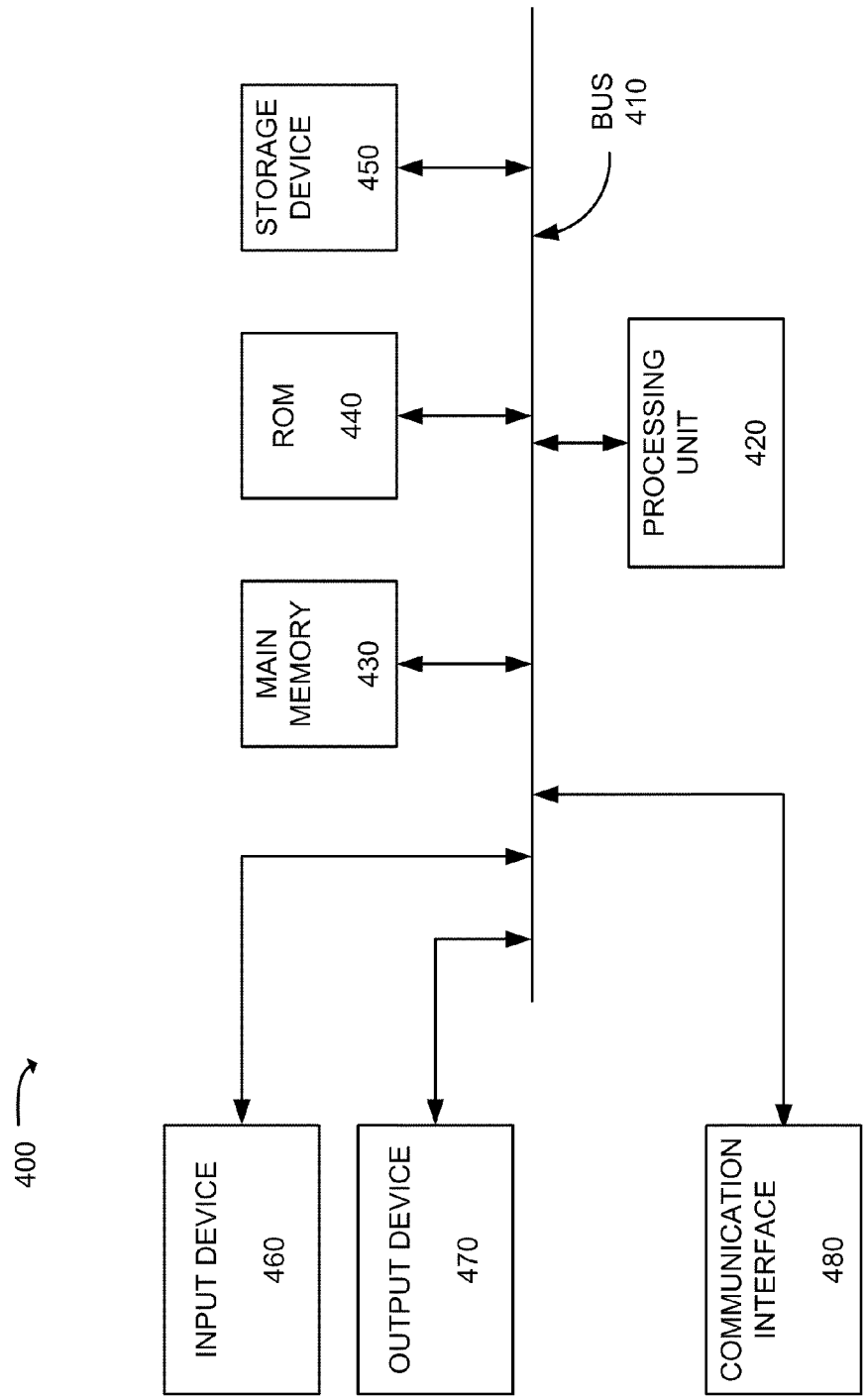
FIG. 4 is a diagram of exemplary components of a device which may correspond to the VOD system, the VOD recommendation system, or the set-top boxes of FIG. 2; or the application server, the viewing history server, the clustering server, or the recommendation server of FIG. 3.

FIG. 4 is a diagram of exemplary components of a device 400, which may correspond to VOD system 205, VOD recommendation system 210, STBs 215-1 through 215-N, application server 300, viewing history server 310, clustering server 320, or recommendation server 330.

Device 400 may include a bus 410, a processing unit 420, a main memory 430, a read only memory (ROM) 440, a storage device 450, an input device 460, an output device 470, and a communication interface 480. Bus 410 may include a path that permits communication among the elements of device 400.

Processing unit 420 may include a processor, microprocessor, or processing logic that may interpret and execute instructions. Main memory 430 may include a random access memory (RAM) or another type of dynamic storage device that may store information and instructions for execution by processing unit 420. ROM 440 may include a ROM device or another type of static storage device that may store static information and instructions for use by processing unit 420. Storage device 450 may include a magnetic and/or optical recording medium and its corresponding drive.

Input device 460 may include one or more mechanisms that permit an operator to input information to device 400, such as, for example, a keypad or a keyboard, voice recognition and/or biometric mechanisms, etc. Output device 470 may include one or more mechanisms that output information to the operator, including a display, a speaker, etc. Communication interface 480 may include any transceiver-like mechanism that enables device 400 to communicate with other devices and/or systems. For example, communication interface 480 may include mechanisms for communicating with another device or system via a network, such as network 220.

Device 400 may perform certain operations or processes, as will be described in detail below. Device 400 may perform these operations in response to processing unit 420 executing software instructions contained in a computer-readable medium, such as memory 430. A computer-readable medium may be defined as a physical or logical memory device. A logical memory device may include memory space within a single physical memory device or spread across multiple physical memory devices.

The software instructions may be read into main memory 430 from another computer-readable medium, such as storage device 450, or from another device via communication interface 480. The software instructions contained in main memory 430 may cause processing unit 420 to perform operations or processes that will be described later. Alternatively, hardwired circuitry may be used in place of or in combination with software instructions to implement processes consistent with the principles of the invention. Thus, exemplary implementations are not limited to any specific combination of hardware circuitry and software.

Figure 5:
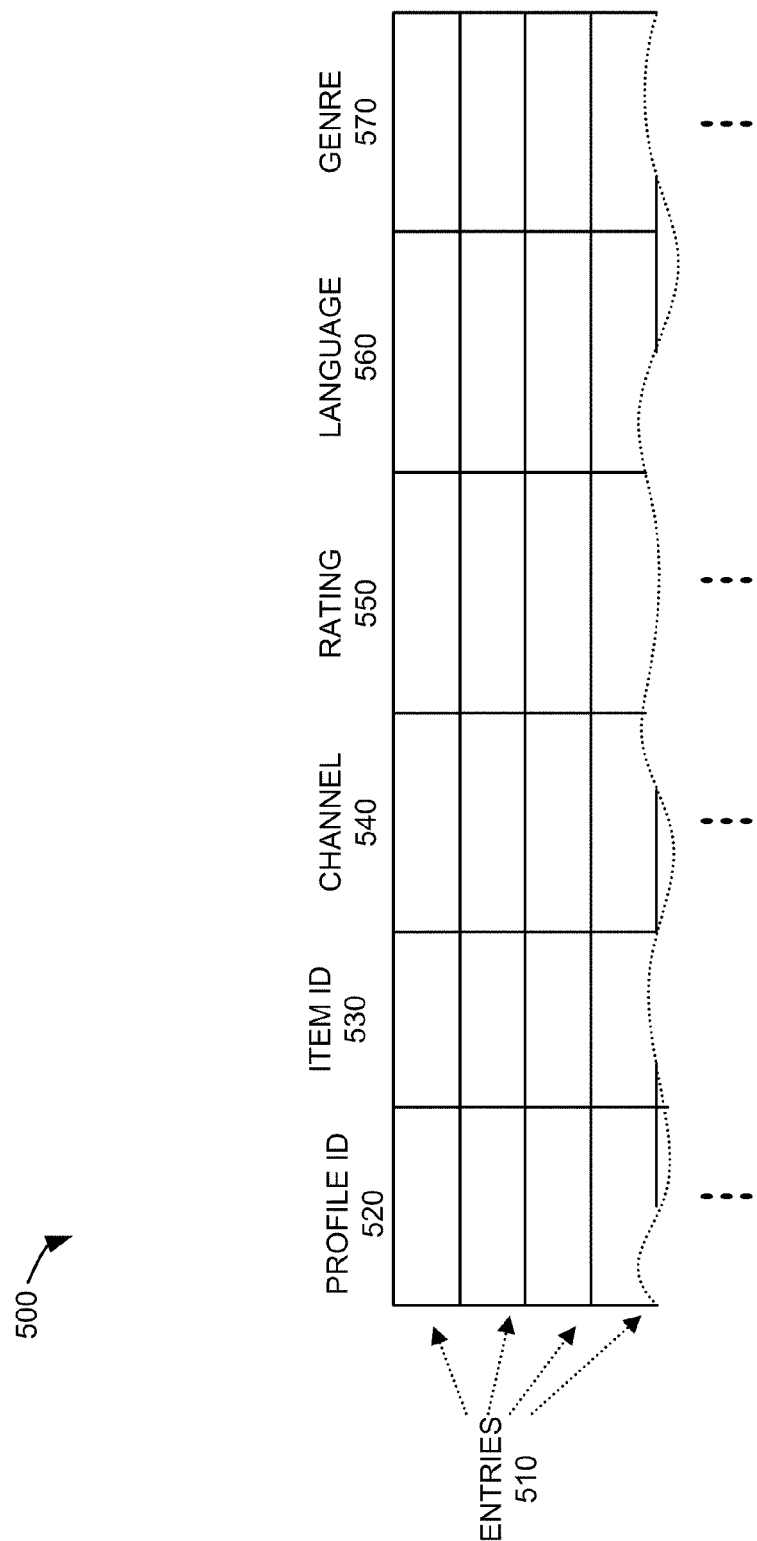
FIG. 5 is a diagram that illustrates an exemplary viewing history table that may store users' television program viewing activity.

FIG. 5 illustrates an exemplary portion of a viewing history table 500 that may be stored in association with VOD recommendation system 210. Table 500 may include one or more entries 510, each of which may include, for example, a profile identifier (ID) field 520, an item ID field 530, a channel field 540, a rating field 550, a language field 560, and a genre field 570.

Profile ID field 520 may include a unique identifier associated with a respective STB 215-1 through 215-N from which the data contained in fields 530-570 is obtained. In one embodiment, the unique identifier may include a hash of the STBs identifier (STBID).

Item ID field 530 may include a unique identifier for the TV program viewed by the user. In one embodiment, the unique identifier may include a hash of a TV program identifier. Channel field 540 may identify the channel on which the TV program identified in item ID field 530 was watched. Rating field 550 may identify an implicit or explicit content rating associated with the TV program identified in item ID field 530. The rating may include any type of rating that provides a TV viewer with an idea of the content of the TV program and its possible suitability for different viewers (e.g., children, adults, etc.). Language field 560 may identify the language in which the TV program identified in item ID field 530 is presented (e.g., English, Spanish, etc.). Genre field 570 may identify one or more genres (e.g., action, comedy, etc.) associated with the TV program identified in item ID field 530. The one or more genres may include, for example, comedy, sports, drama, horror, suspense, etc.

Figure 6:
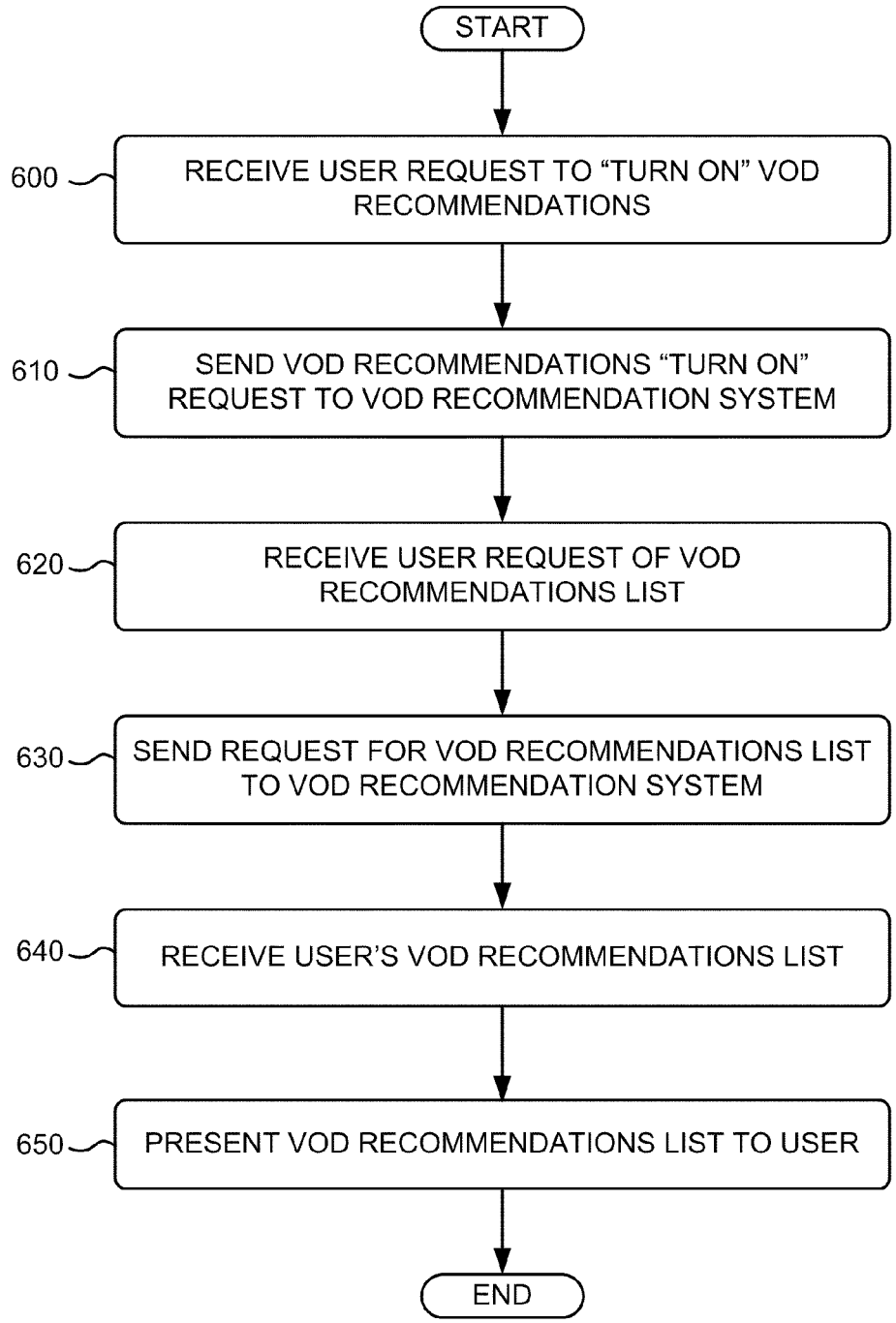
FIG. 6 is a flow diagram illustrating an exemplary process for "turning on" a VOD recommendation service and for receiving subsequent VOD recommendations from the VOD recommendation system.

FIG. 6 is a flow diagram illustrating an exemplary process for "turning on" a VOD recommendation service and for receiving subsequent VOD recommendations from VOD recommendation system 210. The exemplary process of FIG. 6 may be performed by STB 215. In other embodiments, the exemplary process of FIG. 6 may be performed by STB 215 in conjunction with other devices, or by one or more other devices other than STB 215.

Figure 7A:
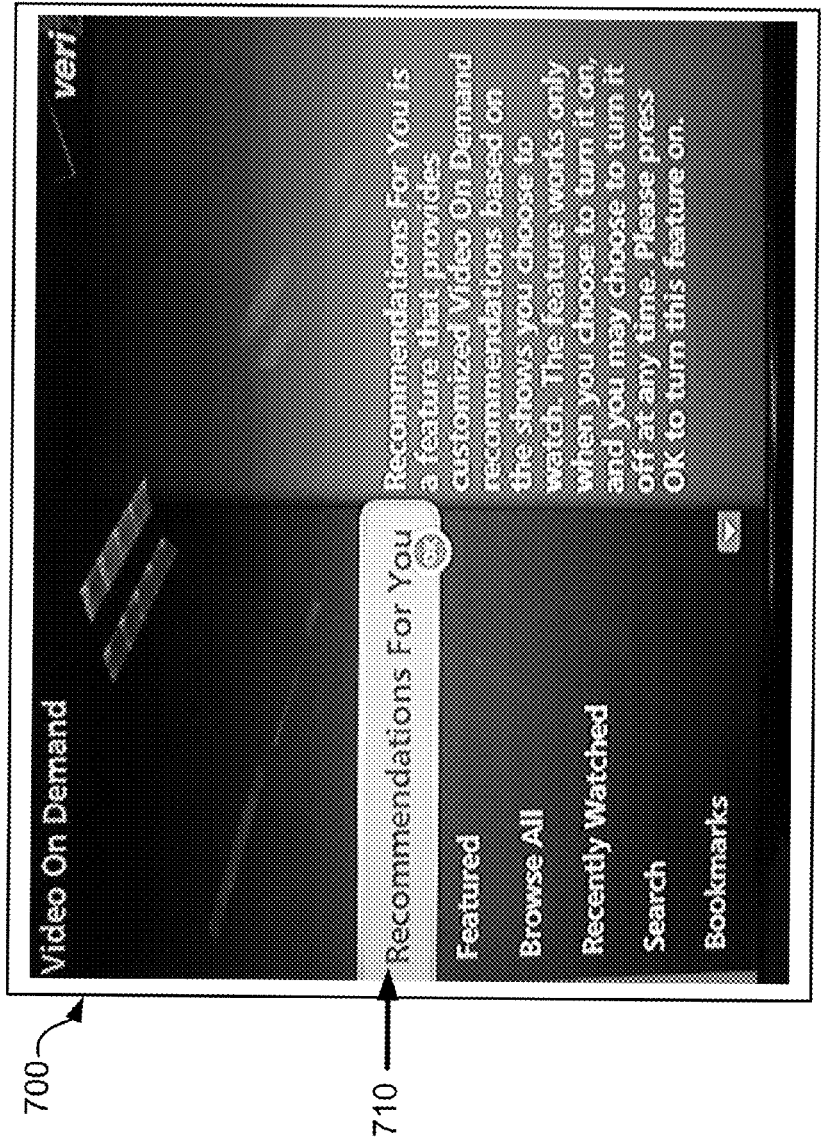
FIGS. 7A and 7B illustrate exemplary user interfaces for "turning on" a VOD recommendation service.
Figure 7B:
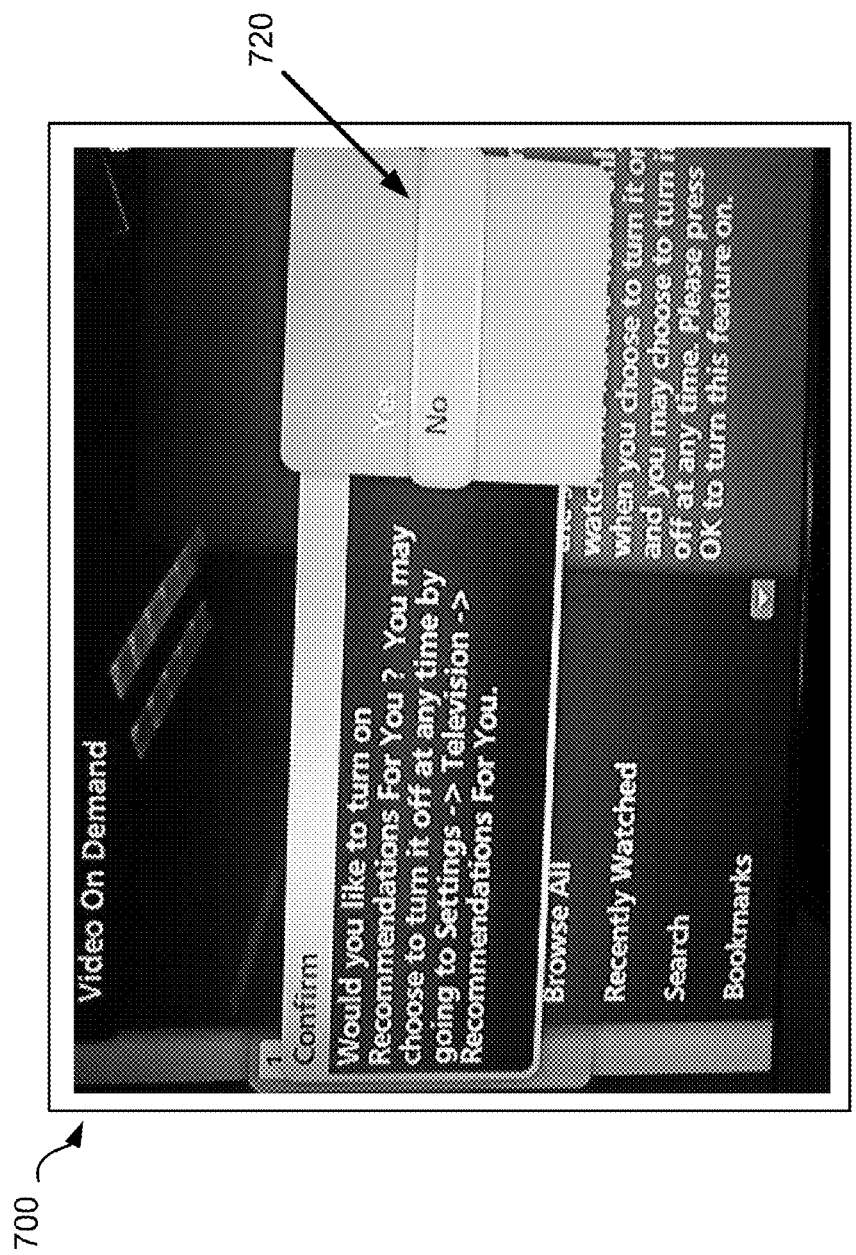

The exemplary process may begin with receiving a user request to "turn on" VOD recommendations (block 600). As shown in the example of FIG. 7A, STB 215 may provide a user interface 700 to a respective user 225 with a menu item 710 that enables user 225 to "turn on" VOD recommendations. As further shown in FIG. 7B, user interface 700 may further enable user 225 to explicitly select either "Yes" or "No" as to whether user 225 wishes to "turn on" VOD recommendations.

The VOD recommendations "turn on" request may be sent to VOD recommendations system 210 (block 610). STB 225 may send the "turn on" request to VOD recommendation system 210 via network 220. In one embodiment, STB 225 may send the "turn on" request to viewing history server 310 and/or recommendation server 330 of VOD recommendation system 210.

A user request of a VOD recommendations list may be received (block 620). STB 215 may receive user input that indicates that the user wishes to receive a VOD recommendations list. For example, a user interface provided by STB 215 may enable the user to request a VOD recommendations list. A request for the VOD recommendations list may be sent to VOD recommendations system 210 (block 630). STB 225 may send the user request to VOD recommendations system 210 via network 225. In one embodiment, STB 225 may send the user request to recommendation server 330 of VOD recommendation system 210.

Figure 8:
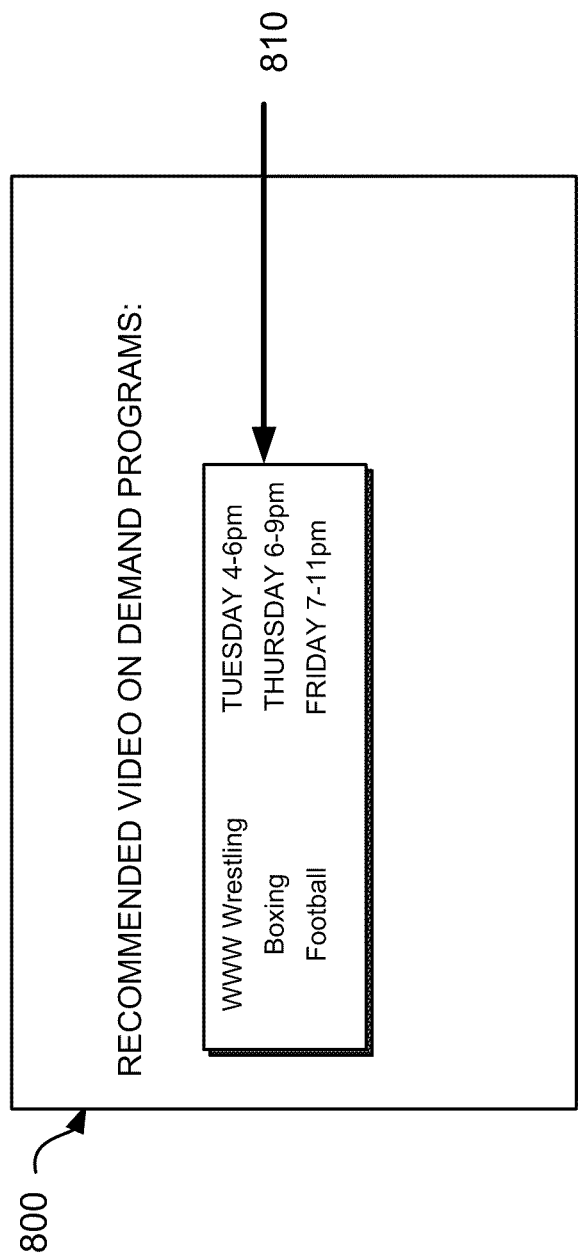
FIG. 8 illustrates an exemplary user interface that displays recommended VOD programs to a user.

The user's VOD recommendations list may be received (block 640). STB 225 may receive a VOD recommendations list from VOD recommendation system 210 via network 220. In one embodiment, STB 225 may receive the VOD recommendations list from recommendation server 330. The VOD recommendations list may be presented to the user (block 650). As shown in the example of FIG. 8, STB 215 may provide a display 800 to user 225 that presents a list 810 of VOD recommendations received from VOD recommendation system 210.

Figure 9A:
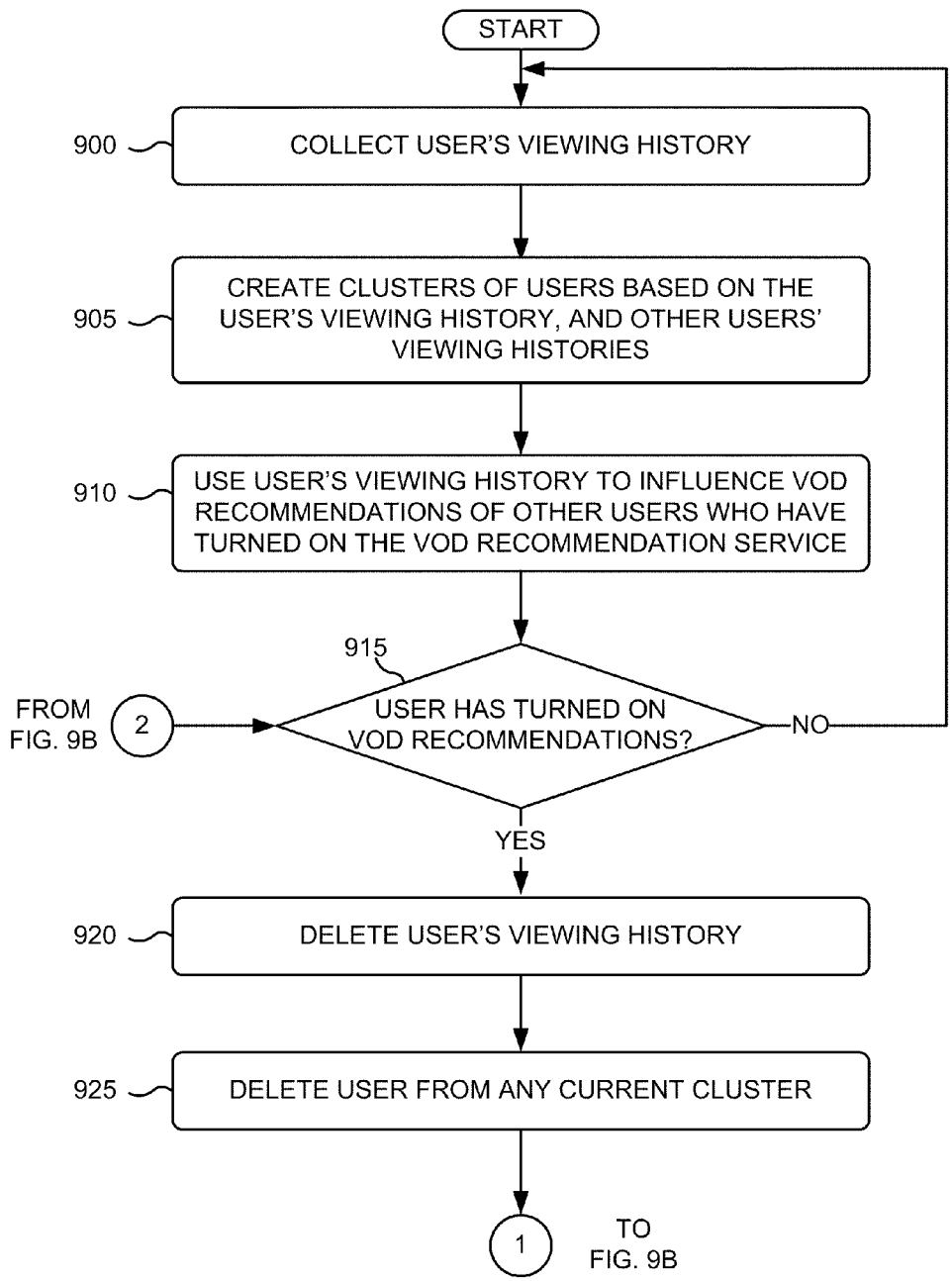
FIGS. 9A and 9B are flow diagrams that illustrate an exemplary process for collecting a user's viewing history and for generating user clusters based on the collected viewing history.
Figure 9B:
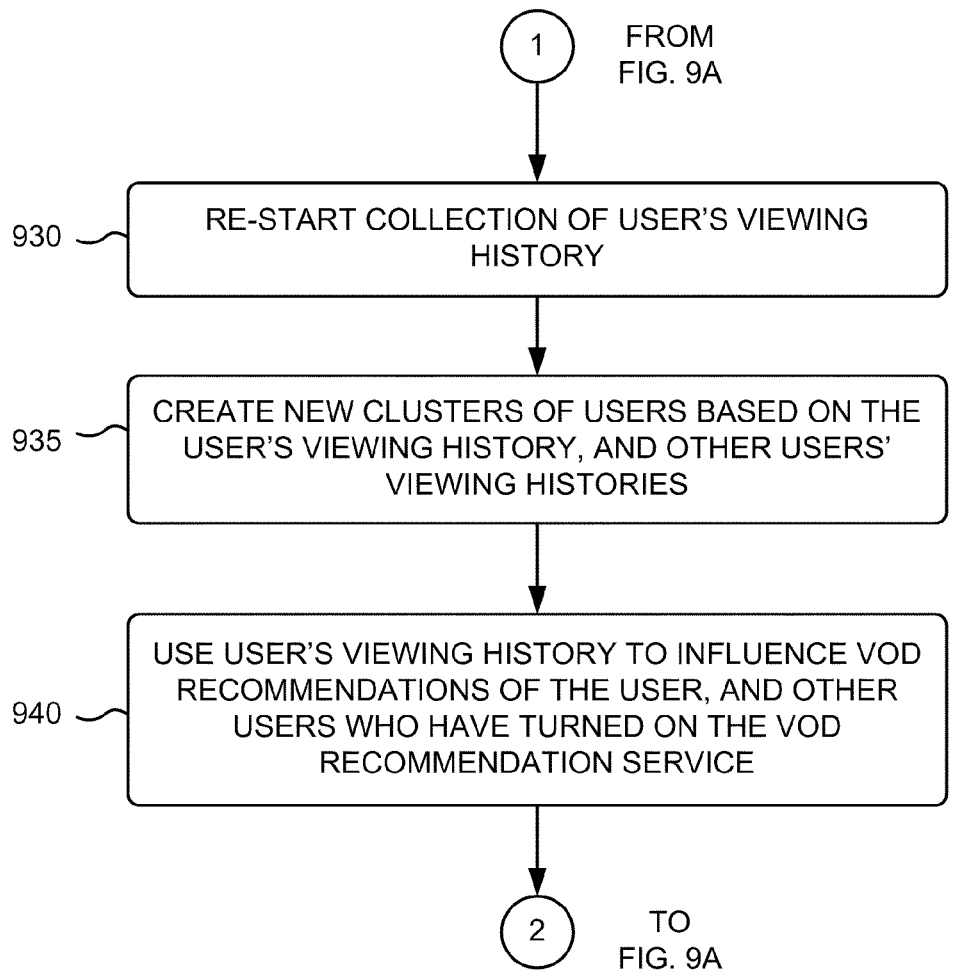

FIGS. 9A and 9B are flow diagrams that illustrate an exemplary process for collecting a user's viewing history and for generating user clusters based on the collected viewing history. The exemplary process of FIGS. 9A and 9B may be performed by VOD recommendation system 210. In other embodiments, the exemplary process of FIGS. 9A and 9B may be performed by VOD recommendation system 210 in conjunction with other devices, or by one or more devices other than VOD recommendation system 210.

The exemplary process may begin with the collection of a user's viewing history (block 900). VOD recommendation system 210 may record the user's viewing history via a respective STB 215. In one embodiment, viewing history server 310 of VOD recommendation system 210 may obtain users 225-1 through 225-N viewing histories via respective ones of STBs 215-1 through 215-N. Viewing history server 310 may extract pertinent data from the obtained viewing histories and store as appropriate entries in viewing history table 500 (FIG. 5). For example, for each TV program watched by a user 225, viewing history server 310 may obtain the user 225's STB's identifier (STBID) and may store a hash of the STBID in profile ID field 520 of an entry 510 of table 500. Viewing history server 310 may further obtain an identifier of the TV program being watched by user 225 and may store a hash of the TV program ID in item ID field 530 of entry 510 of table 500. Viewing history server 310 may also obtain a channel identifier of the TV program being watched by user 225 and store the identified channel in channel field 540 of entry 510 of table 500. Viewing history server 310 may additionally obtain a rating, language and genre associated with the TV program being watched by user 225 and may store them in rating field 550, language field 560 and genre field 570, respectively.

Clusters of users may be created based the user's collected viewing history, and the collected viewing history of other users (block 905). Any clustering technique may be used for associating the user with other users in one or more clusters. For example, if the user watches Spanish language TV programs, the user may be associated in a cluster with other users that also watch Spanish language TV programs. Any given user may be a member of one or more (i.e., multiple) clusters. The one or more clusters may subsequently be used for generating VOD recommendations to the user.

The user's viewing history may be used to influence the VOD recommendations of other users who have "turn on" he VOD recommendation service (block 910). Until the user "turns on" the VOD recommendation service, the user's collected viewing history may only be used to influence the VOD recommendations of other users that have "turned on" the recommendation service. The user's viewing history may be used to influence the VOD recommendations of other users who are in a same cluster (obtained in block 905 above) as the user.

A determination may be made whether the user has "turned on" the VOD recommendation service (block 915). VOD recommendation system 210 may receive a "turn on" request from STB 215 as described above with respect to block 610 of FIG. 6. If the user has not "turned on" the VOD recommendation service (NO—block 915), then the exemplary process may return to block 900 with continuing collection of the user's viewing history. If the user has "turned on" the VOD recommendation service (YES—block 915), then the user's viewing history may be deleted (block 920). VOD recommendation system 210 may search table 500 and may delete every entry 510 whose profile ID field 520 matches the STBID of STB 215 associated with the user "turning on" the VOD recommendation service. The user may be deleted from any current cluster (block 925). The user "turning on" the VOD recommendation service may, for example, be deleted from each cluster, created in block 905 above, of which the user is a member. The collection of the user's viewing history may be re-started (block 930). VOD recommendation system 210 may re-start collection of the user's viewing history in a similar fashion to that described above with respect to block 900. Table 500 may, thus, begin to be re-populated with new entries that correspond to the user "turning on" the VOD recommendation service.

New clusters of users may be created based on the user's viewing history and other users' viewing histories (block 935). The new clusters of users may be created in a similar fashion to that described above with respect to block 905, using updated data stored in table 500.

The user's viewing history may be used to influence VOD recommendations of the user, and other users who have "turned on" the VOD recommendation service (block 940). Since the user has "turned on" the VOD recommendation service, the user's collected viewing history may be used to influence VOD recommendations to the user, and to other user's that have "turned on" the VOD recommendation service. For example, the user's viewing history may be used to influence VOD recommendations made to the user, and to other users who are members of a same cluster (obtained in block 935 above) as the user. The exemplary process may return to block 915 of FIG. 9A.

Figure 10:
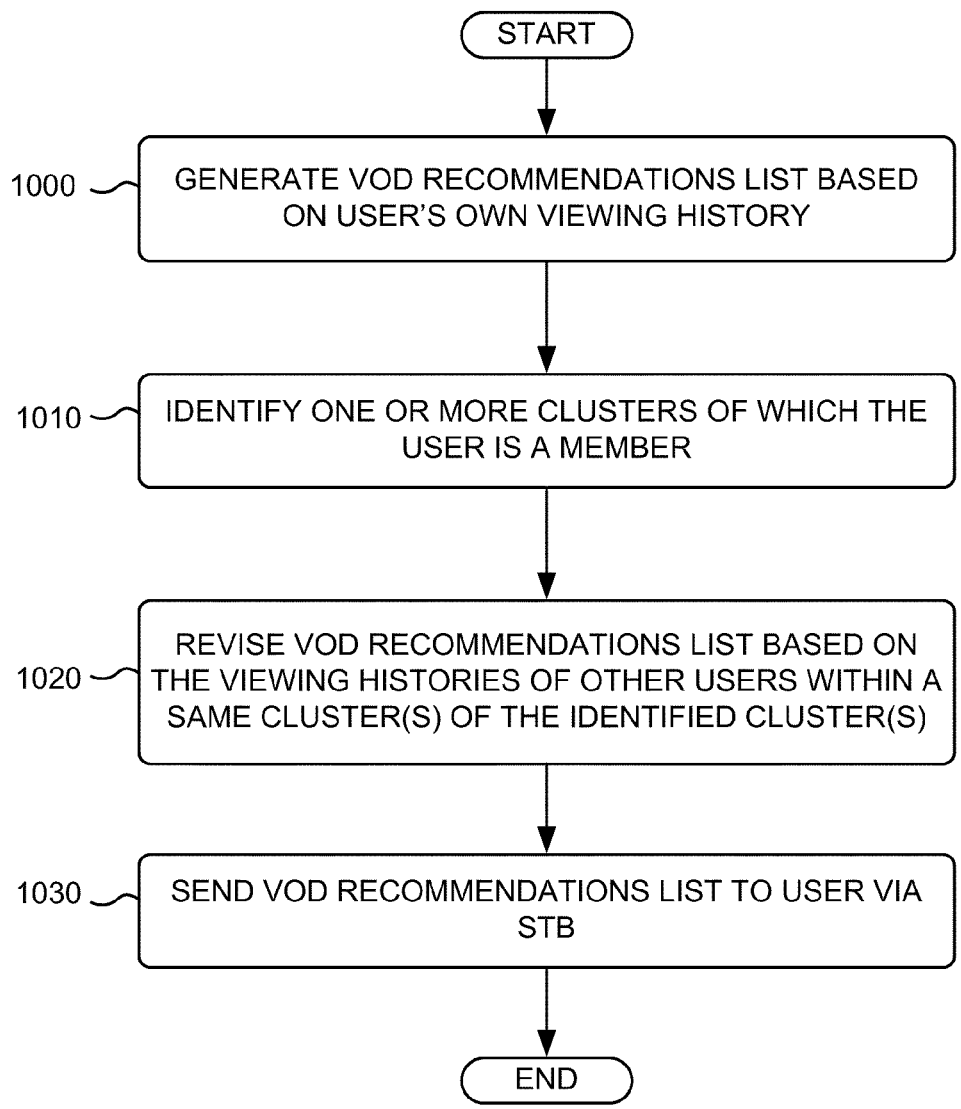
FIG. 10 is a flow diagram that illustrates an exemplary process for generating VOD recommendations for a given user and sending those VOD recommendations to a STB associated with the user.

FIG. 10 is a flow diagram illustrating an exemplary process for generating VOD recommendations for a given user that has "turned on" the VOD recommendation service, and for sending those VOD recommendations to a STB associated with the user. The exemplary process of FIG. 10 may be performed by VOD recommendation system 210. In other embodiments, the exemplary process of FIG. 10 may be performed by VOD recommendation system 210 in conjunction with other devices, or by one or more devices other than VOD recommendation system 210.

The exemplary process may begin with the generation of a VOD recommendations list for a user based on the user's own viewing history (block 1000). VOD recommendations system 210 may perform a lookup in table 500 to match the user's STBID with the content of one or more profile ID fields 520 associated with entries 510 of table 500. For each matching entry 510 of table 500, VOD recommendations system 210 may retrieve respective contents of fields 530-570. The retrieved contents of fields 530-570 of each matching entry 510 may used to identify VOD programs having the same, or similar, channels, ratings, languages, or genres. For example, if entries 510 in table 500 for the STBID that corresponds to the user indicate that the user watches a certain, high percentage of Sports TV programs, then VOD recommendations system 210 may include Sports VOD programs in the recommendations list. The user's viewing activity used for generating VOD recommendations lists may not be limited to the viewing activity described herein. Other types of viewing activity/history may also be used.

One or more clusters of which the user is a member may be identified (block 1010). For example, one or more of the clusters created in block 935 above may be identified. The user's VOD recommendations list may be revised based on viewing histories of other users within a same cluster(s) of the identified cluster(s) (block 1020). VOD recommendations system 210 may determine STBIDs that correspond to each other user in a same cluster of the identifier cluster(s). VOD recommendations system 210 may then perform a look-up into table 500 to match the determined STBIDs with the content of one or more profile ID fields 520 associated with entries 510 of table 500. For each matching entry 510 of table 500, VOD recommendations system 210 may retrieve respective contents of fields 530-570. The retrieved contents of fields 530-570 of each matching entry 510 may used to identify VOD programs having the same, or similar, channels, ratings, languages, or genres. For example, if entries 510 in table 500 for the STBID that corresponds to the user indicate that the user watches a certain, high percentage of Sports TV programs, then VOD recommendations system 210 may include Sports VOD programs in the recommendations list. The user's viewing activity used for generating VOD recommendations lists may not be limited to the viewing activity described herein. Other types of viewing activity/history may also be used. The VOD recommendations list may be sent to the user via the STB (block 1030). VOD recommendations system 210 may send the revised recommendations list to a respective STB 215 via network 220.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6, 9A, 9B and 10, the order of the blocks may be modified in other embodiments. Further, non-dependent blocks may be performed in parallel. Exemplary techniques have been described herein for generating recommendations of VOD programs based on users' viewing history. Exemplary techniques described herein may also be applied to generating recommendations of TV programs (i.e., regular, non-VOD programs) based on users' viewing histories as an alternative to, or in conjunction with, recommendations of VOD programs.

It will be apparent that embodiments, as described above, may be implemented in many different forms of software, firmware, and hardware in the implementations illustrated in the figures. The actual software code or specialized control hardware used to implement embodiments is not limiting of the invention. Thus, the operation and behavior of the embodiments have been described without reference to the specific software code, it being understood that software and control hardware may be designed based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
   collecting, by the computing device, television (TV) program viewing activity of a user to produce a first viewing activity collection;
   creating, by the computing device, one or more first clusters of users based on the first viewing activity collection and TV program viewing activities of other users;
   using, by the computing device, the first viewing activity collection to make TV program recommendations to the other users via a TV program recommendation service;
   determining, by the computing device, whether an indication that the user wishes to turn on the TV program recommendation service has been received;
   deleting, by the computing device, the first viewing activity collection responsive to receiving the indication that the user wishes to turn on the TV program recommendation service, wherein deleting the first viewing activity collection includes deleting all of the TV program viewing activity of the user collected in the first viewing activity collection;
   collecting, by the computing device, TV program viewing activity of the user, that occurs subsequent to the received indication and the deletion of the first viewing activity collection, to produce a second viewing activity collection, wherein the second viewing activity collection includes none of the TV program viewing activity of the user collected in the first viewing activity collection; and
   using, by the computing device, the second viewing activity collection to provide second TV program recommendations to the user via the TV program recommendation service.

2. The method of claim 1, where the second TV program recommendations are provided to the user via a set-top box and a television associated with the user.

3. The method of claim 1, further comprising:
using the second viewing activity collection to make third TV program recommendations to one or more of the other users via the TV program recommendation service.

4. The method of claim 1, wherein the second TV program recommendations comprise Video on Demand (VOD) program recommendations and wherein the TV program recommendation service comprises a VOD program recommendation service.

5. The method of claim 1, further comprising:
collecting TV program viewing activities of the other users to produce a third viewing activity collection; and
creating the one or more first clusters of users based on the first viewing activity collection and the third viewing activity collection,
where using the first viewing activity collection to make TV program recommendations to other users comprises:
making the TV program recommendations to the other users based on the created one or more first clusters.

6. The method of claim 5, wherein, when it is determined that the indication that the user wishes to turn on the TV program recommendation service has been received, the method further comprises:
deleting the user from the one or more first clusters.

7. The method of claim 5, further comprising:
creating one or more second clusters of users based on the second viewing activity collection and the third viewing activity collection,
where using the second viewing activity collection to provide second TV program recommendations to the user comprises:
making the second TV program recommendations to the user based on the one or more second clusters.

8. A system, comprising:
a memory; and
one or more processing units to:
collect television (TV) program viewing activity of a user to produce a first viewing activity collection,
use the first viewing activity collection to make Video On Demand (VOD) program recommendations to other users via a VOD program recommendation service,
receive an indication that the user wishes to turn on the VOD program recommendation service,
delete the first viewing activity collection responsive to receiving the indication that the user wishes to turn on the VOD program recommendation service, wherein deleting the first viewing activity collection includes deleting all of the TV program viewing activity of the user collected in the first viewing activity collection,
collect TV program viewing activity of the user, that occurs subsequent to the received indication and the deletion of the first viewing activity collection, to produce a second viewing activity collection, wherein the second viewing activity collection includes none of the TV program activity of the user collected in the first viewing activity collection,
use the second viewing activity collection to provide second VOD program recommendations to the user via the VOD program recommendation service,
collect TV program viewing activities of the other users to produce a third viewing activity collection, and
create one or more clusters of users based on the first viewing activity collection and the third viewing activity collection,
wherein, when using the first viewing activity collection to make VOD program recommendations to other users, the one or more processing units are further configured to:
make the VOD program recommendations to the other users based on the created one or more clusters, and
wherein the one or more processing units are further configured to:
delete the user from the one or more clusters responsive to receiving the indication that the user wishes to turn on the VOD program recommendation service.

9. The system of claim 8, where the second VOD program recommendations are provided to the user via a set-top box and a television associated with the user.

10. The system of claim 8, where the one or more processing units are further to:
use the second viewing activity collection to make third VOD program recommendations to one or more of the other users via the VOD program recommendation service.

11. The system of claim 8, where the one or more processing units are further configured to:
create one or more second clusters of users based on the second viewing activity collection and the third viewing activity collection,
wherein, when using the second viewing activity collection to provide second VOD program recommendations to the user, the one or more processing units are further configured to:
make the second VOD program recommendations to the user based on the one or more second clusters of users.

12. A tangible non-transitory computer-readable medium containing instructions executable by at least one processor, the computer-readable medium comprising:
one or more instructions for collecting television (TV) program viewing activity of a user to produce a first viewing activity collection;
one or more instructions to create one or more first clusters of users based on the first viewing activity collection and TV program viewing activities of other users;
one or more instructions for using the first viewing activity collection to make TV program recommendations to the other users via a TV program recommendation service;
one or more instructions for determining whether an indication that the user wishes to turn on the TV program recommendation service has been received;
one or more instructions for deleting the first viewing activity collection responsive to receiving the indication that the user wishes to turn on the TV program recommendation service, wherein deleting the first viewing activity collection includes deleting all of the TV program viewing activity of the user collected in the first viewing activity collection;
one or more instructions for collecting TV program viewing activity of the user, that occurs subsequent to the received indication and the deletion of the first viewing activity collection, to produce a second viewing activity collection, wherein the second viewing activity collection includes none of the collected TV program viewing activity of the user from the first viewing activity collection; and
    one or more instructions for using the second viewing activity collection to provide second TV program recommendations to the user via the TV program recommendation service.

13. The tangible non-transitory computer-readable medium of claim 12, where the second TV program recommendations are provided to the user via a set-top box and a television associated with the user.

14. The tangible non-transitory computer-readable medium of claim 12, further comprising:
    using the second viewing activity collection to make third TV program recommendations to one or more of the other users via the TV program recommendation service.

15. The tangible non-transitory computer-readable medium of claim 12, where the second TV program recommendations comprise Video on Demand (VOD) program recommendations and where the TV program recommendation service comprises a VOD program recommendation service.

16. The tangible non-transitory computer-readable medium of claim 14, further comprising:
    one or more instructions for collecting TV program viewing activities of the other users to produce a third viewing activity collection; and
    one or more instructions for creating the one or more first clusters of users based on the first viewing activity collection and the third viewing activity collection,
    where the one or more instructions for using the first viewing activity collection to make TV program recommendations to the other users comprises:
    one or more instructions for making the TV program recommendations to the other users based on the created one or more first clusters.

17. The tangible non-transitory computer-readable medium of claim 16, where the one or more instructions for determining whether the indication that the user wishes to turn on the TV program recommendation service has been received further comprises:
    one or more instructions for deleting the user from the one or more clusters when it is determined that the indication that user wishes to turn on the TV program recommendation service has been received.

18. The tangible non-transitory computer-readable medium of claim 12, further comprising:
    one or more instructions for creating one or more second clusters of users based on the second viewing activity collection and the third viewing activity collection,
    where the one or more instructions for using the second viewing activity collection to provide second TV program recommendations to the user further comprises:
    one or more instructions for making the second TV program recommendations to the user based on the one or more second clusters.

19. A method, comprising:
collecting, by one or more computing devices, television (TV) program viewing activity of a user to produce a first viewing activity collection;
collecting, by the one or more computing devices, TV program viewing activity of other users to produce a second viewing activity collection;
creating, by the one or more computing devices, one or more first clusters of users based on the first viewing activity collection and the second viewing activity collection;
using, by the one or more computing devices, the one or more first clusters to make TV program recommendations to the other users via a TV program recommendation service;
receiving, by the one or more computing devices, an indication that the user wishes to turn on the TV program recommendation service;
deleting, by the one or more computing devices, the first viewing activity collection for the user responsive to the receipt of the indication that the user wishes to turn on the TV program recommendation service, wherein deleting the first viewing activity collection includes deleting all of the TV program viewing activity of the user collected in the first viewing activity collection;
deleting, by the one or more computing devices, the user from the one or more first clusters responsive to the receipt of the indication that the user wishes to turn on the TV program recommendation service;
collecting, by the one or more computing devices, TV program viewing activity of the user, that occurs subsequent to the received indication and the deletion of the first viewing activity collection, to produce a third viewing activity collection, wherein the third viewing activity collection includes none of the TV program viewing activity of the user collected in the first viewing activity collection;
creating, by the one or more computing devices, one or more second clusters of users based on the third viewing activity collection; and
using, by the one or more computing devices, the third viewing activity collection to provide second TV program recommendations to the user via the TV program recommendation service.

\* \* \* \* \*